United States Patent [19]
Prakash et al.

[11] Patent Number: 5,490,551
[45] Date of Patent: Feb. 13, 1996

[54] RADIAL TIRES CONTAINING STEEL MONOFILAMENT IN THE CARCASS PLY

[75] Inventors: Amit Prakash, Hudson; Dong K. Kim, Akron; Robert M. Shemenski, North Canton; William C. Lewis, Cuyahoga Falls, all of Ohio

[73] Assignee: The Goodyear Tire & Rubber Company, Akron, Ohio

[21] Appl. No.: 425,686

[22] Filed: Apr. 19, 1995

Related U.S. Application Data

[63] Continuation of Ser. No. 232,305, Apr. 25, 1994, abandoned, which is a continuation of Ser. No. 946,698, Sep. 18, 1992, abandoned.

[51] Int. Cl.$^6$ .............................. B60C 9/02; B60C 9/04; B60C 9/08
[52] U.S. Cl. ..................... 152/556; 152/548; 152/557
[58] Field of Search .......................... 152/548, 556–558, 152/560, 526–527

[56] References Cited

U.S. PATENT DOCUMENTS

| | | | |
|---|---|---|---|
| 1,577,050 | 3/1926 | Weigel | 152/556 |
| 2,317,912 | 4/1943 | Howe | 152/556 |
| 2,874,742 | 2/1959 | Lugli | 152/526 X |
| 2,986,191 | 5/1961 | Beckadolph | 152/556 |
| 3,224,482 | 12/1965 | Barassi et al. | 152/526X |
| 3,240,249 | 3/1966 | Lugli | 152/526 X |
| 3,298,417 | 1/1967 | Keefe, Jr. | 152/556 X |
| 3,692,080 | 9/1972 | Boileau | |
| 4,219,601 | 8/1980 | Inoue et al. | 152/527 |
| 4,371,025 | 2/1983 | Canevari et al. | |
| 4,545,834 | 10/1985 | Shemenski et al. | |
| 4,657,058 | 4/1987 | Kabe et al. | |
| 4,667,721 | 5/1987 | Cohen et al. | |
| 4,715,420 | 12/1987 | Kabe et al. | |
| 4,733,706 | 3/1988 | Schmit | |
| 4,759,806 | 7/1988 | Dambre | |
| 4,765,386 | 8/1988 | Ogino et al. | |
| 4,788,815 | 12/1988 | Umezawa | |
| 4,829,760 | 5/1989 | Dambre | |
| 4,832,103 | 5/1989 | Slivka et al. | |
| 4,850,412 | 7/1989 | Gupta | |
| 4,854,032 | 8/1989 | Dambre | |
| 4,960,473 | 10/1990 | Kim et al. | |
| 4,966,216 | 10/1990 | Kawasaki et al. | |
| 5,066,455 | 11/1991 | Kim et al. | |

FOREIGN PATENT DOCUMENTS

| | | |
|---|---|---|
| 0292039 | 11/1988 | European Pat. Off. |
| 2419179 | 10/1979 | France |
| 912134 | 12/1991 | South Africa |
| 9114811 | 10/1991 | WIPO |

*Primary Examiner*—Adrienne C. Johnstone
*Attorney, Agent, or Firm*—Bruce J. Hendricks

[57] ABSTRACT

The present invention relates to a pneumatic radial tire wherein the carcass ply contains a rubberized layer of steel monofilaments.

16 Claims, 2 Drawing Sheets

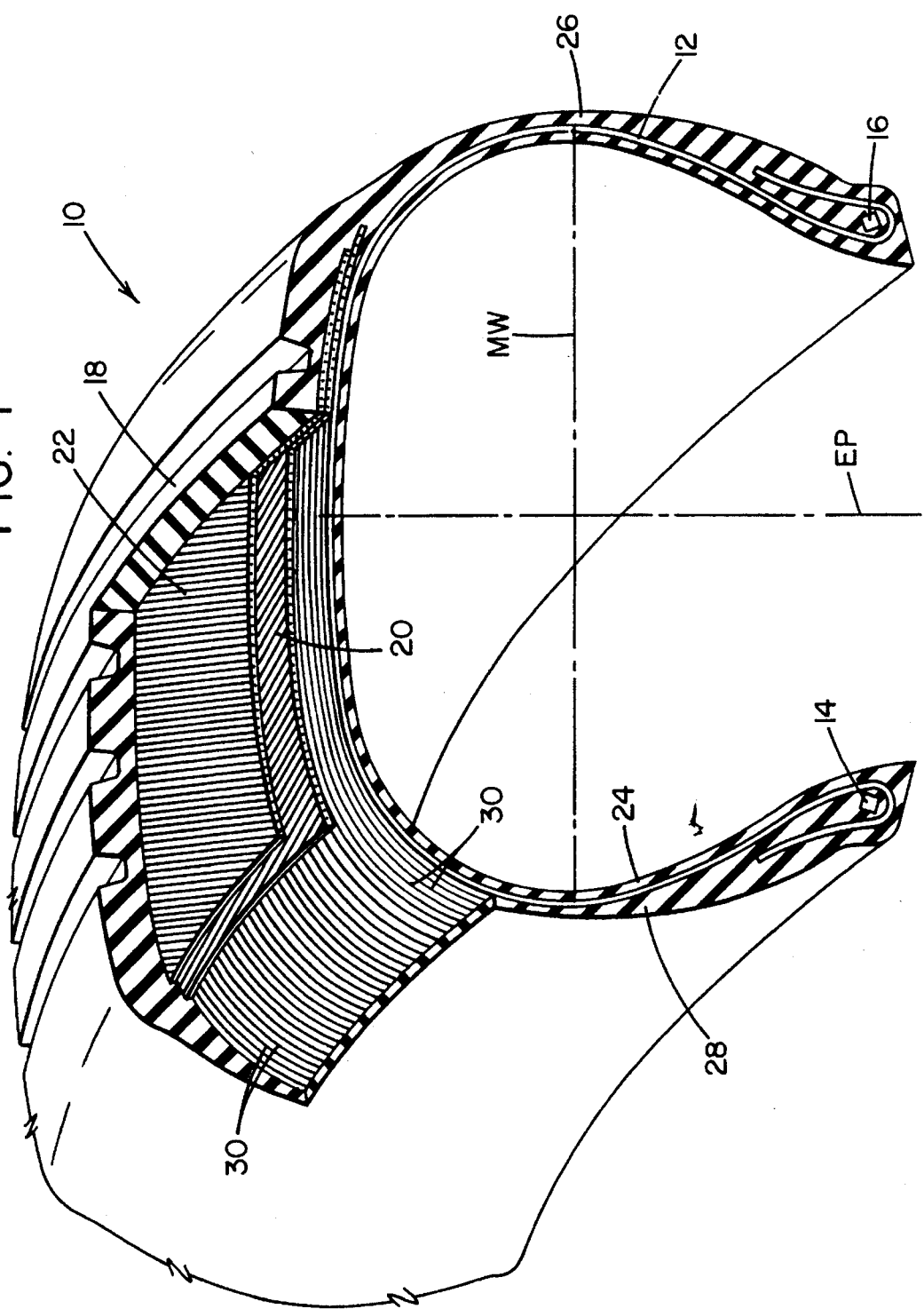

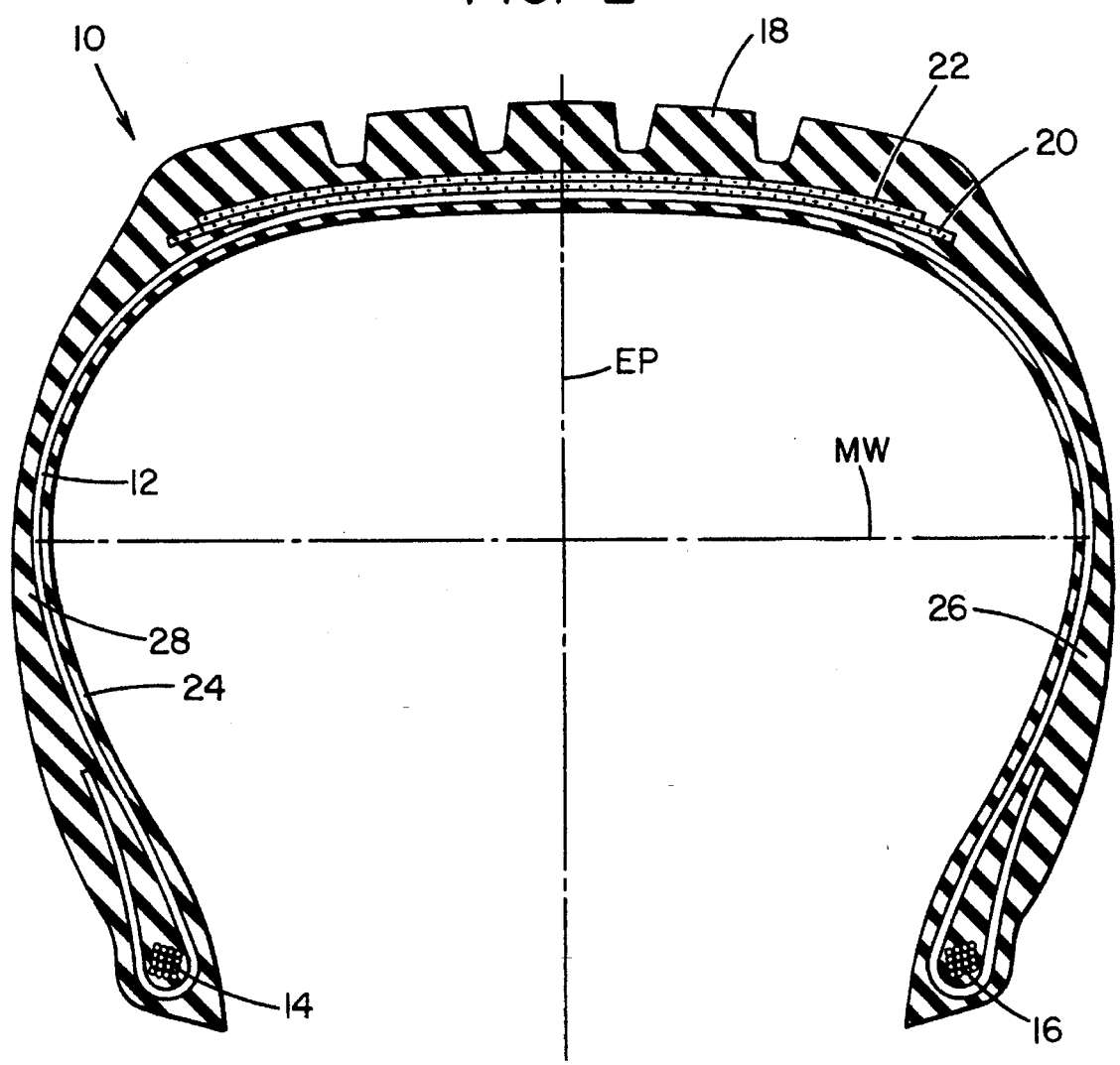

5,490,551

RADIAL TIRES CONTAINING STEEL MONOFILAMENT IN THE CARCASS PLY

This is a continuation of application Ser. No. 08/232,305, filed on Apr. 25, 1994 now abandoned, which is a continuation of application(s) Ser. No. 07/946,698, filed on Sep. 18, 1992, now abandoned.

TECHNICAL FIELD

The present invention relates to a radial tire. containing steel monofilaments in the carcass ply of the tire.

BACKGROUND OF THE INVENTION

Conventionally, the carcass of radial pneumatic tires for use in passenger and light truck applications have polyester filaments embedded therein. These filaments are woven into cords to increase the ultimate strength of the carcass ply. It has also been known to use monofilaments made of fiberglass or polyester in the tire; however, due to the inherent properties of these synthetic polymers, the strength requirements needed for the carcass are unmet. Thus, commercially the use of the polyester cord in the carcass has dominated. Unfortunately, as a result of using cord in a carcass, the weight contributed to the tire from the cord is high. With the ever present desire of auto manufacturers to increase the mileage requirements of their vehicles, there is a large demand for lighter tires without sacrificing their strength integrity.

SUMMARY OF THE INVENTION

The present invention relates to a pneumatic radial tire having a carcass ply which comprises a layer of steel monofilaments. The advantages of the present invention include a tire which not only maintains excellent handling characteristics but does so without the conventional weight aspects of typical reinforcements in the carcass.

BRIEF DESCRIPTION OF THE DRAWINGS

FIG. 1 shows a pneumatic tire in partial sectional view.

FIG. 2 illustrates a radially cross-section through a radial carcass tire.

DETAILED DESCRIPTION OF THE INVENTION

There is disclosed pneumatic radial tire comprising:

(a) a pair of axially spaced apart annular beads; and (b) at least one carcass ply which extends between said beads and is folded thereabout wherein said carcass ply comprises a layer of steel monofilaments arranged so as to have from 30 to 60 ends per inch when measured in a tire circumferential direction at a location having a tire maximum width, said monofilaments being laid at an angle between 75° and 105° with respect to the equatorial plane of the tire and wherein each said steel monofilament having
a tensile strength of at least 3650 MPa,
a diameter of from 0.1 mm to 0.22 mm,
a total elongation of at least 2%, and a torsion value of at least 20 turns with a gauge length of 200 times the diameter of said monofilament.

Referring to FIGS. 1 and 2, the present invention relates to a pneumatic tire 10. "Pneumatic tire" means a laminated mechanical device of generally toroidal shape (usually an open-torus) having beads, at least one carcass ply and a tread. When mounted on the wheel of a motor vehicle, the tire through its tread provides traction and contains the fluid that sustains the vehicle load. More specifically, the present invention relates to a radial-ply tire. Radial-ply tire means a belted or circumferentially-restricted pneumatic tire in which the carcass ply monofilaments which extend from bead to bead are laid at angles between 75° and 105° with respect to the equatorial plane of the tire.

The pneumatic tire 10 has a carcass ply 12 incorporating a plurality of steel monofilaments. "Carcass" means the tire structure apart from the belt structure, tread, undertread and sidewall rubber over the plies, but including the beads. "Ply" means a continuous layer of rubber-coated parallel filaments. In those instances when one desires to utilize the essence of the present invention for larger size tires, two or more carcass ply may be used.

The pneumatic tire 10 has a pair of axially spaced apart annular beads 14, 16. "Bead" means the part of the tire comprising an annular tensile member wrapped by ply monofilaments and shaped, with or without other reinforcement elements such as flippers, chippers, apexes, toe guards and chafers, to fit the design rim. The carcass ply 12 extends between the beads 14, 16 and is folded thereabout. The pneumatic tire 10 has a conventional tread 18 disposed on the crown of the carcass 12. "Tread" means a molded rubber component which, when bonded to a tire casing, includes that portion of the tire that comes into contact with the road when the tire is normally inflated and under normal load.

The pneumatic tire 10 has a belt structure comprising at least two belts 20, 22. Belt structure means at least two annular layers or plies of parallel cords, woven or unwoven, underlying the tread, unanchored to the bead, and having both left and right cord angles in the range from 17° to 27° with respect to the equatorial plane of the tire. "Equatorial plane (EP)" means the plane perpendicular to the tire's axis of rotation and passing through the center of its tread. It is understood that the particular belt structure illustrated in FIGS. 1 and 2 and described herein is merely an example used in the preferred embodiment and that a tire designer may employ any arrangement of belt plies in accordance with the performance requirements of the particular tire while still practicing the present invention. For example, in those instances where a larger tire is being constructed for use in a radial light truck application, three or more belts may be used. In addition, the cords in the belt plies may be rayon, polyester, glass fiber, aramid, steel wire or the like. Preferably, the cord is steel wire. Conventional diameters and cords may be used in conjunction with the present invention.

If the tire is of the tubeless variety, a substantially air impervious layer 24 is disposed inwardly of the carcass ply 12 and contiguous to an inflation chamber defined by the volume bounded by the tire 10 and rim assembly (not shown). Most preferably, a barrier layer (not shown) is disposed between the air impervious layer 24 and the carcass ply 12. The barrier ply functions to separate the air impervious layer from the elastomeric layer in which the steel monofilaments of the carcass ply 12 are embedded. Elastomeric sidewalls 26, 28 are disposed axially outwardly of the carcass structure.

The carcass ply 12 has a layer of steel monofilaments 30 arranged so as to have from about 25 to about 124 ends per inch when measured in a tire circumferential direction at a location having a tire maximum width (MW). Preferably, the layer of steel monofilaments 30 are arranged so as to have about 30 to about 60 ends per inch at the location having a tire maximum width MW. In a particularly preferred tire, the layer of steel monofilaments 30 are arranged so as to have about 35 to about 55 ends per inch at the location having a tire maximum width MW. The above calculations for ends per inch are based upon the range of diameters for the monofilament, strength of the monofilament and the practical strength requirement for the carcass ply. For example, the high number of ends per inch would include the use of a lower diameter wire for a given strength versus a lower number of ends per inch for a lower diameter wire for the same strength. In the alternative, if one elects to use a monofilament of a given diameter, one may have to use more or less ends per inch depending on the strength of the wire.

The pneumatic tire 10 is particularly characterized by the use of very high tensile steel monofilament wire. The tensile strength of the individual monofilaments, must at a minimum, be 3,650 megapascals. Preferably, the tensile strength ranges from about 3,650 megapascals to 4,700 megapascals, with a range of from about 3,850 to 4,200 megapascals being particularly preferred. As known to those skilled in the art, tensile strength of an individual filament is generally measured according to ASTM E8M-90a.

The diameter of the steel monofilament may range from about 0.1 millimeters to 0.22 millimeters. In one embodiment the diameter range is form 0.1 mm to less than 0.20 mm. Preferably, the diameter of the wire will range from about 0.13 millimeters to 0.20 millimeters with a range of from about 0.15 to 0.18 being particularly preferred.

Another critical property of the steel monofilament wire is that the total elongation for the wire must be at least 2 percent over a gauge length of 25 centimeters. Total elongation is measured according to ASTM E8M-90a. Preferably, the total elongation ranges from about 2 percent to 4 percent. A particularly preferred total elongation ranges from about 2.3 to about 3.0.

The torsion values for the steel monofilament wire should be at least 20 turns with a gauge length of 200 times the diameter of the wire. Generally, the torsion value ranges from about 20 to about 100 turns. Preferably, the torsion values range from about 30 to about 80 turns with a range of from about 35 to 55 being particularly preferred. The torsion values are determined according to ASTM Test Method E 558-83 with test lengths of 200 times the diameter of the wire.

Representative of the type of steel filaments that may be used in the present invention include the filaments disclosed in South African Patent 91/2134 having a tensile strength of 3,650 megapascals and a diameter of 0.20 millimeters.

The type of steel alloy that may be used in the steel monofilaments are known to those skilled in the art and include such alloys disclosed in U.S. Pat. Nos. 4,960,473 and 5,066,455, incorporated herein in their entirety.

The steel monofilaments of the carcass ply intersect the equatorial plane (EP) of the tire at a angle in the range of from 75° to 105°. Preferably, the steel monofilaments intersect (LEP) at an angle of from 82° to 98°. When the tire has a single carcass ply and the carcass ply has the steel monofilaments, the preferred range is from 89° to 91°. When the pneumatic tire 10 has two carcass plies, at least one must utilize the steel monofilaments. Preferably, both carcass plies use the steel monofilaments. When both carcass plies utilize the steel monofilaments, the steel monofilaments of one carcass ply intersect the EP at a right angle in the range of from about 85° to 95° and the steel monofilaments of the other carcass ply intersect EP at an opposite or left angle in the range of from about 85° to 95°.

The use of steel monofilaments in the carcass as disclosed herein may be applied to general passenger radial tires as well as racing tires, agricultural tires, motor cycles, small or medium size truck tires and leisure vehicle tires. Preferably, the pneumatic tires of the present invention are directed to passenger tires and medium to light truck tires.

A pneumatic radial ply tire according to FIGS. 1 and 2 was manufactured in the size P165/80R13. The steel monofilament used in the single carcass ply had a tensile strength of 3,950 megapascals, a diameter of 0.15 millimeters and an elongation of 2.2 percent and a torsion value of 40 turns with a gauge length of 200 times the diameter of the steel monofilament. The steel monofilaments of the carcass ply were oriented at 90° with respect to the equatorial plane. The monofilaments were arranged so as to have 48 ends per inch when measured in a tire circumferential direction at a location having a tire maximum width. The belt structure had two plies of steel cords (2×0.30 mm) underlying the tread and having both left and right cord angles of 24° with respect to the equatorial plane of the tire.

For comparative testing, a pneumatic radial tire was manufactured in the size P165/80R13 using polyester cord in the single carcass ply. The table below provides some physical properties of each tire and the tire construction of each tire.

TABLE I

|  | Polyester Control | Monosteel |
|---|---|---|
| Tire Construction |  |  |
| Carcass Ply Reinforcement | Polyester Cord 1000/3 | Monosteel Filament 3950 MPa |
| EPI at MW | 19 | 57 |
| Cord/Wire Strength (N) | 214 | 70 |
| Cord/Wire Diameter (mm) | 0.66 | 0.15 |
| Tire Properties |  |  |
| Tire Weight (kg) | 6.67 | 6.35 |
| Load for 2.54 cm deflation (N) | 4232 | 4210 |
| Burst (kg/cm$^2$) | 19.69 | 17.58 |
| Force & Moment[1] |  |  |
| Cornering Coefficient | .208 | .223 |
| Aligning Torque (mm) | 8.19 | 7.31 |

[1]According to SAE J1107

The above data demonstrates that approximately a 5% weight reduction can be made without any major sacrifice in the performance characteristics of the tire. These advantages are as a result of using the unique monosteel reinforcement in the carcass ply.

What is claimed is:

1. A pneumatic radial tire comprising:
   (a) a pair of axially-spaced-apart annular beads; and
   (b) at least one carcass ply which extends between said beads and is folded thereabout wherein at least one of said at least one carcass ply comprises a layer of steel monofilaments arranged so as to have from 25 to 124 ends per inch when measured in a tire circumferential direction at a location having a tire maximum width, each said steel monofilament having
   a tensile strength of at least 3650 MPa,
   a diameter of from 0.1 mm to less than 0.20 mm,
   a total elongation of at least 2%, and
   a torsion value of at least 20 turns with a gauge length of 200 times the diameter of said monofilament.

2. The radial tire of claim 1 wherein said tensile strength ranges from 3650 MPa to 4700 MPa.

3. The radial tire of claim 2 wherein said tensile strength ranges from 3850 to 4200 MPa.

4. The radial tire of claim 1 wherein said diameter of each monofilament ranges from about 0.13 mm to 0.20 mm.

5. The radial tire of claim 1 wherein said elongation ranges from 2.3% to 3%.

6. The radial tire of claim 1 wherein said torsion value ranges from about 20 to 100 turns.

7. The radial tire of claim 1 wherein said tire is a passenger tire.

8. The radial tire of claim 1 wherein said tire is a light truck tire.

9. The radial tire of claim 1 wherein said steel monofilaments are arranged so as to have 30 to 60 ends per inch when measured in a tire circumferential direction at a location having a tire maximum width.

10. The radial tire of claim 1 additionally comprising a belt structure having at least two annular layers of parallel cords, underlying a tread, unanchored to said beads and having both left and right cord angles in the range from 17 degrees to 27 degrees with respect to the equatorial plane of the tire.

11. The radial tire of claim 1 wherein said at least one carcass ply is a single carcass ply.

12. The radial tire of claim 1 wherein said steel monofilaments intersect the equatorial plane of the tire at an angle in the range of from 75° to 105°.

13. The radial tire of claim 12 wherein said steel monofilaments intersect the equatorial plane of the tire at an angle in the range of from 82° to 98°.

14. The radial tire of claim 1 wherein said at least one carcass ply is two carcass plies.

15. The radial tire of claim 14 wherein both carcass plies each comprise a said layer of steel monofilments.

16. The radial tire of claim 15 wherein the steel monofilaments of one carcass ply intersect the equatorial plane at a right angle in the range of from 85° to 95° and the steel monofilaments of the other carcass ply intersect the equatorial plane at a left angle in the range of from 85° to 95°.

* * * * *